(12) United States Patent
Schefe et al.

(10) Patent No.: US 9,836,360 B2
(45) Date of Patent: Dec. 5, 2017

(54) RECOVERY STRATEGY WITH DYNAMIC NUMBER OF VOLUMES

(71) Applicants: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(72) Inventors: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(73) Assignee: SAP SE, Walldorf (DE)

( * ) Notice: Subject to any disclaimer, the term of this patent is extended or adjusted under 35 U.S.C. 154(b) by 401 days.

(21) Appl. No.: 14/554,033

(22) Filed: Nov. 25, 2014

(65) Prior Publication Data
US 2016/0147616 A1    May 26, 2016

(51) Int. Cl.
*G06F 11/14* (2006.01)
*G06F 17/30* (2006.01)

(52) U.S. Cl.
CPC ...... *G06F 11/1469* (2013.01); *G06F 11/1451* (2013.01); *G06F 11/1458* (2013.01); *G06F 11/1471* (2013.01); *G06F 11/1474* (2013.01); *G06F 17/30073* (2013.01); *G06F 17/30076* (2013.01); *G06F 17/30144* (2013.01); *G06F 17/30289* (2013.01); *G06F 2201/80* (2013.01); *G06F 2201/82* (2013.01); *G06F 2201/84* (2013.01)

(58) Field of Classification Search
CPC ......... G06F 17/30368; G06F 17/30575; G06F 11/0727; G06F 11/2257; G06F 11/3476; G06F 11/1466; G06F 11/1451; G06F 11/1471; G06F 17/30289; G06F 17/30073; G06F 17/30076; G06F 2221/0782; G06F 2201/84; G06F 11/1469; G06F 11/1448; G06F 11/1458; G06F 11/1474
See application file for complete search history.

(56) References Cited

U.S. PATENT DOCUMENTS 7,107,292 B1 * 9/2006 Hrle .................... G06F 11/1471
8,364,648 B1 * 1/2013 Sim-Tang ......... G06F 17/30368
707/674

(Continued)

FOREIGN PATENT DOCUMENTS

WO    WO 02/21273       * 3/2002
WO    WO 2007/059057    * 5/2007
WO    WO 2010/090761    * 8/2010

*Primary Examiner* — Srirama Channavajjala
(74) *Attorney, Agent, or Firm* — Buckley, Maschoff & Talwalkar LLC

(57) ABSTRACT

A system includes reception of a command to recover a database to a point in time, determining a log backup which covers the point in time, determination of a sequence identifier associated with the log backup, collection of log backups which are older than the determined log backup and associated with the sequence identifier, and a data backup associated with the sequence identifier, and execution of a recovery of the database based on the determined log backup and the collected log backups and data backup.

15 Claims, 8 Drawing Sheets

(56) References Cited

U.S. PATENT DOCUMENTS

| | | | |
|---|---|---|---|
| 2004/0139128 A1* | 7/2004 | Becker | G06F 11/1456 |
| 2004/0260726 A1* | 12/2004 | Hrle | G06F 11/1466 |
| 2004/0260894 A1* | 12/2004 | Keohane | G06F 11/1466 |
| | | | 711/162 |
| 2005/0015416 A1* | 1/2005 | Yamagami | G06F 11/1471 |
| 2007/0136381 A1* | 6/2007 | Cannon | G06F 11/1451 |
| 2008/0243954 A1* | 10/2008 | Augenstein | G06F 11/1451 |
| 2009/0089614 A1* | 4/2009 | Eguchi | G06F 11/142 |
| | | | 714/15 |
| 2009/0249005 A1* | 10/2009 | Bender | G06F 11/1435 |
| | | | 711/162 |
| 2010/0011239 A1* | 1/2010 | Kawaguchi | G06F 11/1458 |
| | | | 714/6.12 |
| 2010/0198791 A1* | 8/2010 | Wu | G06F 11/1451 |
| | | | 707/644 |
| 2013/0212068 A1* | 8/2013 | Talius | G06F 17/30088 |
| | | | 707/639 |
| 2013/0254590 A1* | 9/2013 | Chercoles Sanchez | G06F 17/30584 |
| | | | 714/6.1 |
| 2014/0164331 A1* | 6/2014 | Li | G06F 11/1471 |
| | | | 707/648 |

* cited by examiner

| | Backup Id | Type | Volume | Timestamp | GUID | Log Positions |
|---|---|---|---|---|---|---|
| 202 | ~~~ | Data | IndxServr | ~~~~~~~~~~~ | xv4454 | ~~~ |
| 204 | ~~~ | Data | StatServr | ~~~~~~~~~~~ | dd3323t | ~~~ |
| 206 | ~~~ | Data | NameServr | ~~~~~~~~~~~ | 342345ff | ~~~ |
| 208 | ~~~ | Log | NameServr | ~~~~~~~~~~~ | 342345ff | ~~~ |
| 210 | ~~~ | Log | IndxServr | ~~~~~~~~~~~ | xv4454 | ~~~ |
| 212 | ~~~ | Log | IndxServr | ~~~~~~~~~~~ | xv4454 | ~~~ |

| Backup Id | Type | Volume | Timestamp | GUID | Log Positions |
|---|---|---|---|---|---|
| ~~~ | Data | IndxServr | ~~~~~~~~~~~~ | xv4454 | ~~~ |
| ~~~ | Data | StatServr | ~~~~~~~~~~~~ | dd3323t | ~~~ |
| ~~~ | Data | NameServr | ~~~~~~~~~~~~ | 342345ff | ~~~ |
| ~~~ | Log | NameServr | ~~~~~~~~~~~~ | 342345ff | ~~~ |
| ~~~ | Log | IndxServr | ~~~~~~~~~~~~ | xv4454 | ~~~ |
| ~~~ | Log | IndxServr | ~~~~~~~~~~~~ | xv4454 | ~~~ |
| ~~~ | Rmv | IndxServr | ~~~~~~~~~~~~ | xv4454 | ~~~ |

*FIG. 5*

| | Backup Id | Type | Volume | Timestamp | GUID | Log Positions |
|---|---|---|---|---|---|---|
| 202 | ~~~ | Data | IndxServr | ~~~~~~~~~~~~ | xv4454 | ~~~ |
| 204 | ~~~ | Data | StatServr | ~~~~~~~~~~~~ | dd3323t | ~~~ |
| 206 | ~~~ | Data | NameServr | ~~~~~~~~~~~~ | 342345ff | ~~~ |
| 208 | ~~~ | Log | NameServr | ~~~~~~~~~~~~ | 342345ff | ~~~ |
| 210 | ~~~ | Log | IndxServr | ~~~~~~~~~~~~ | xv4454 | ~~~ |
| 212 | ~~~ | Log | IndxServr | ~~~~~~~~~~~~ | xv4454 | ~~~ |
| 214 | ~~~ | Rmv | IndxServr | ~~~~~~~~~~~~ | xv4454 | ~~~ |
| 216 | ~~~ | Data | NameServr | ~~~~~~~~~~~~ | 342345ff | ~~~ |
| 218 | ~~~ | Data | StatServr | ~~~~~~~~~~~~ | dd3323t | ~~~ |
| 220 | ~~~ | Log | NameServr | ~~~~~~~~~~~~ | 342345ff | ~~~ |
| 222 | ~~~ | Log | NameServr | ~~~~~~~~~~~~ | 342345ff | ~~~ |
| 224 | ~~~ | Add | IndxServr | ~~~~~~~~~~~~ | h34h344j | ~~~ |
| 226 | ~~~ | Data | IndxServr | ~~~~~~~~~~~~ | h34h344j | ~~~ |

FIG. 6

| | Backup Id | Type | Volume | Timestamp | GUID | Log Positions |
|---|---|---|---|---|---|---|
| 202 | ~~~ | Data | IndxServr | ~~~~~~~~~~~ | xv4454 | ~~~ |
| 204 | ~~~ | Data | StatServr | ~~~~~~~~~~~ | dd3323t | ~~~ |
| 206 | ~~~ | Data | NameServr | ~~~~~~~~~~~ | 342345ff | ~~~ |
| 208 | ~~~ | Log | NameServr | ~~~~~~~~~~~ | 342345ff | ~~~ |
| 210 | ~~~ | Log | IndxServr | ~~~~~~~~~~~ | xv4454 | ~~~ |
| 212 | ~~~ | Log | IndxServr | ~~~~~~~~~~~ | xv4454 | ~~~ |
| 214 | ~~~ | Rmv | IndxServr | ~~~~~~~~~~~ | xv4454 | ~~~ |
| 216 | ~~~ | Data | NameServr | ~~~~~~~~~~~ | 342345ff | ~~~ |
| 218 | ~~~ | Data | StatServr | ~~~~~~~~~~~ | dd3323t | ~~~ |
| 220 | ~~~ | Log | NameServr | ~~~~~~~~~~~ | 342345ff | ~~~ |
| 222 | ~~~ | Log | NameServr | ~~~~~~~~~~~ | 342345ff | ~~~ |
| 224 | ~~~ | Add | IndxServr | ~~~~~~~~~~~ | h34h344j | ~~~ |
| 226 | ~~~ | Rcvry | | ~~~~~~~~~~~ | | ~~~ |
| 228 | ~~~ | Data | IndxServr | ~~~~~~~~~~~ | h34h344j | ~~~ |
| 230 | ~~~ | Log | NameServr | ~~~~~~~~~~~ | 7h4jj7890 | ~~~ |
| 232 | ~~~ | Log | IndxServr | ~~~~~~~~~~~ | h34h344j | ~~~ |
| 234 | ~~~ | Log | IndxServr | ~~~~~~~~~~~ | h34h344j | ~~~ |

FIG. 7

RECOVERY STRATEGY WITH DYNAMIC NUMBER OF VOLUMES

BACKGROUND

During operation, database systems generate backup files which may be used to recover from database crashes. The backup files include data backups, which consist of all the data of the database system at a given point in time, and log backups, which describe changes made to the data during a particular time period. In order to perform a recovery, a database administrator specifies a point in time to which the database should be recovered. The point in time may be specified by providing a timestamp or a log position and volume number. Based on the specified point in time, a data backup and a set of log backups are selected. Recovery then consists of restoring the database to the state of the data backup, followed by replaying the log backups in sequence.

Proper selection of the log backups may be difficult if a particular database backup was used for a prior recovery. Specifically, the log backups used for the prior recovery are members of a first log sequence which may include even more recent log backups, while log backups generated after the prior recovery are members of a second independent log sequence.

Moreover, some database systems associate database services with particular volumes, and generate data backups and log backups for each volume independently. Accordingly, a data backup and log backups must be selected for each volume, in a manner that results in a consistent overall database state. This problem is exacerbated by the capability of some database systems to remove and add volumes during operation.

BRIEF DESCRIPTION OF THE DRAWINGS

FIG. 2 is a tabular representation of a portion of a backup catalog according to some embodiments.

FIG. 5 is a tabular representation of a portion of a backup catalog according to some embodiments.

FIG. 6 is a tabular representation of a portion of a backup catalog according to some embodiments.

FIG. 7 is a tabular representation of a portion of a backup catalog according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
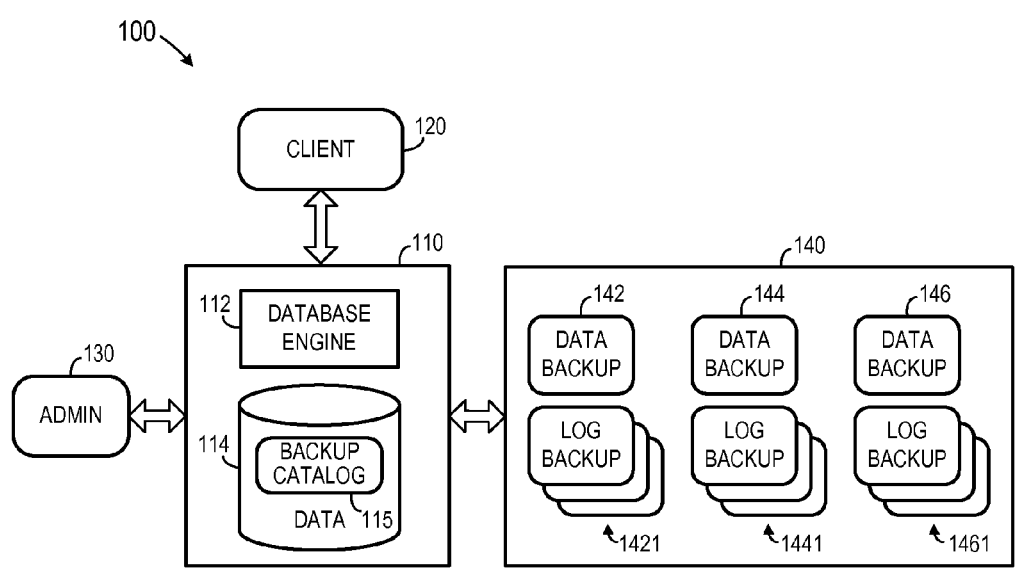
FIG. 1 is a block diagram of a system according to some embodiments.

FIG. 1 is a block diagram of system 100 according to some embodiments. System 100 includes database 110, client 120 and administrator 130. Generally, client 120 requests and receives data from database system 110. More particularly, database engine 112 of database system 110 manages data 114, and provides data of data 114 to client 120 in response to requests received therefrom.

Database system 110 may comprise any query-responsive data source or sources that are or become known, including but not limited to a structured-query language (SQL) relational database management system. Data 114 may comprise a relational database, a multi-dimensional database, an eXtendable Markup Language (XML) document, or any other data storage system storing structured and/or unstructured data. Data 114 may be distributed among several relational databases, multi-dimensional databases, and/or other data sources. Embodiments are not limited to any number or types of data sources.

Database system 110 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, data 114 comprises one or more of conventional tabular data, row-based data stored in row format, column-based data stored in columnar format, and object-based data. Database system 110 may also or alternatively support multi-tenancy by providing multiple logical database systems which are programmatically isolated from one another. Moreover, data 114 may be indexed and/or selectively replicated in an index to allow fast searching and retrieval thereof.

Administrator 130 provides management of database system 110. For example, administrator 130 may define the structure of tables within data 114, configure hosts within database 110, initiate backup operations, and may instruct database engine 112 to recover data 114 based on a specified point in time, as described below.

Administrator 130 and client 120 of system 100 may comprise one or more devices executing program code of a software application for presenting user interfaces to allow interaction with its respective database system. Presentation of a user interface may comprise any degree or type of rendering. For example, administrator 130 may execute a Web Browser to receive a Web page (e.g., in HTML format) from database system 110, and may render and present the Web page according to known protocols. Each administrator or client may also or alternatively present user interfaces by executing a standalone executable file (e.g., an .exe file) or code (e.g., a JAVA applet) within a virtual machine.

System 100 also includes backup file storage 140. Backup file storage 140 may store data backups and log backups created by system 110. Storage 140, as well as the backup processes, may be managed by a third-party backup tool which receives instructions from database engine 112.

Each log backup of backup file storage 140 is associated with one data backup. As described above, one or more log backups may be associated with a data backup and a first sequence of operations, while a second one or more log backups may be associated with the same data backup and a second sequence of operations. According to some embodiments, each data backup and log backup is associated with a particular volume, which in turn is associated with a particular service. Accordingly, backup and recovery of service-associated volumes may be managed independently.

Backup catalog 115 stores information about all data backups and log backups of data 114. FIG. 2 is a tabular representation of a portion of backup catalog 200 according to some embodiments. Each record of backup catalog 200 specifies a backup identifier, a backup type, a volume, a timestamp, a globally-unique identifier (GUID), and log positions associated with a single data backup or log backup. Embodiments are not limited to the structure and contents of backup catalog 200.

The volume field, according to the illustrated embodiment, indicates the server service which is associated with the backup. According to some embodiments, data backups and log backups of each service's volumes are stored independently. This may facilitate recovery of the full database to a particular point in time in cases where a service volume is added or deleted during database operation. For example, if a volume has been deleted and would not be active after a point in time specified by a recovery, the data and log backups of the volume are ignored during the recovery.

According to some embodiments, a command to perform a database backup results in creation of a separate data backup for each currently-existing volume of the database. Records 202-206 of catalog 200 represent three such separate data backups.

Figure 3:
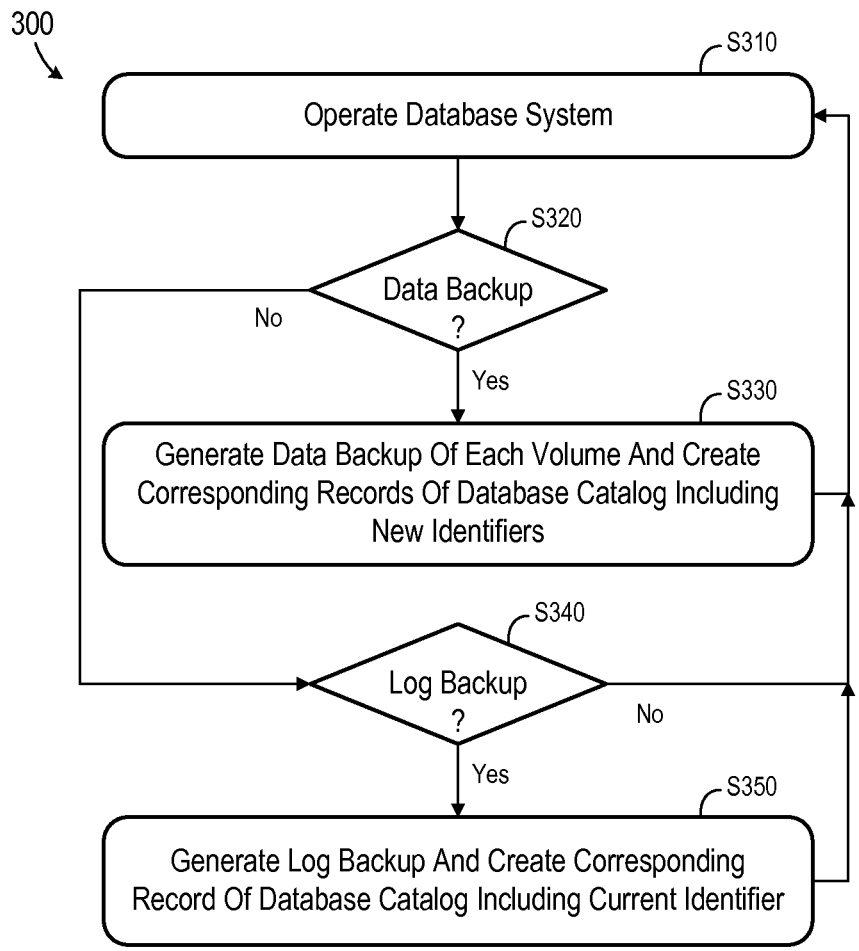
FIG. 3 is a flow diagram of a process according to some embodiments.

FIG. 3 comprises a flow diagram of process 300 according to some embodiments. In some embodiments, various hardware elements of database system 110 execute program code of database engine 120 to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A database system is operated at S310. As described above, operation of the database system at S310 may comprise receiving a query from a database client, and providing data of data 114 to the database client in response to the query. Operation of the database system may also comprise receiving commands to add, delete or modify data of data 114.

During such operation, it is determined at S320 whether a data backup should be performed. The database system may be configured to perform data backups at predetermined intervals, in response to certain parameters (e.g., number of modifications, etc.), or in response to a command received from a database administrator. According to the present example, one instantiation of process 300 executes for each running service, with all instantiations executing in parallel. Accordingly, the determination at S320 relates to a data backup of a particular volume. Flow proceeds to S340 if a data backup is not desired at this time.

At S340, it is determined whether a log backup should be performed. Although the determinations of S320 and S340 are illustrated as sequential, they may be performed independently and/or in parallel. Similarly to S320, the database system may be configured to perform log backups at predetermined intervals, in response to certain parameters or in response to a command received from a database administrator. A log backup describes changes made to the database since a last log backup in a sequence which begins at a particular data backup. Flow returns to S310 if the determination at S340 is negative. Accordingly, flow cycles between S310, S320 and S340 to operate the database system until it is determined that a backup operation should be performed.

If it is determined at S320 that a data backup should be performed, a data backup is generated at S330. The data backup may be generated using any system for creating a data backup that is or becomes known. According to some embodiments, database engine 112 generates data backup 142 at S330, including all of the data of data 114 at the current time.

Also at S330, a record corresponding to the data backup is created in the backup catalog. The record includes a new identifier which has not yet been associated with a record in the backup catalog. Flow then returns to S310 to continue operation of the database system. If, during such operation, it is then determined at S340 that a log backup should be performed, a log backup is generated at S350, along with a new record of the backup catalog including the current identifier.

Backup catalog 200 of FIG. 2 illustrates the results of several iterations of process 300 according to some embodiments. Specifically, records 202, 206 and 208 were created in response to a data backup. Next, in response to three subsequent affirmative determinations at S340, log backups and corresponding records 208-212 were created.

Figure 4:
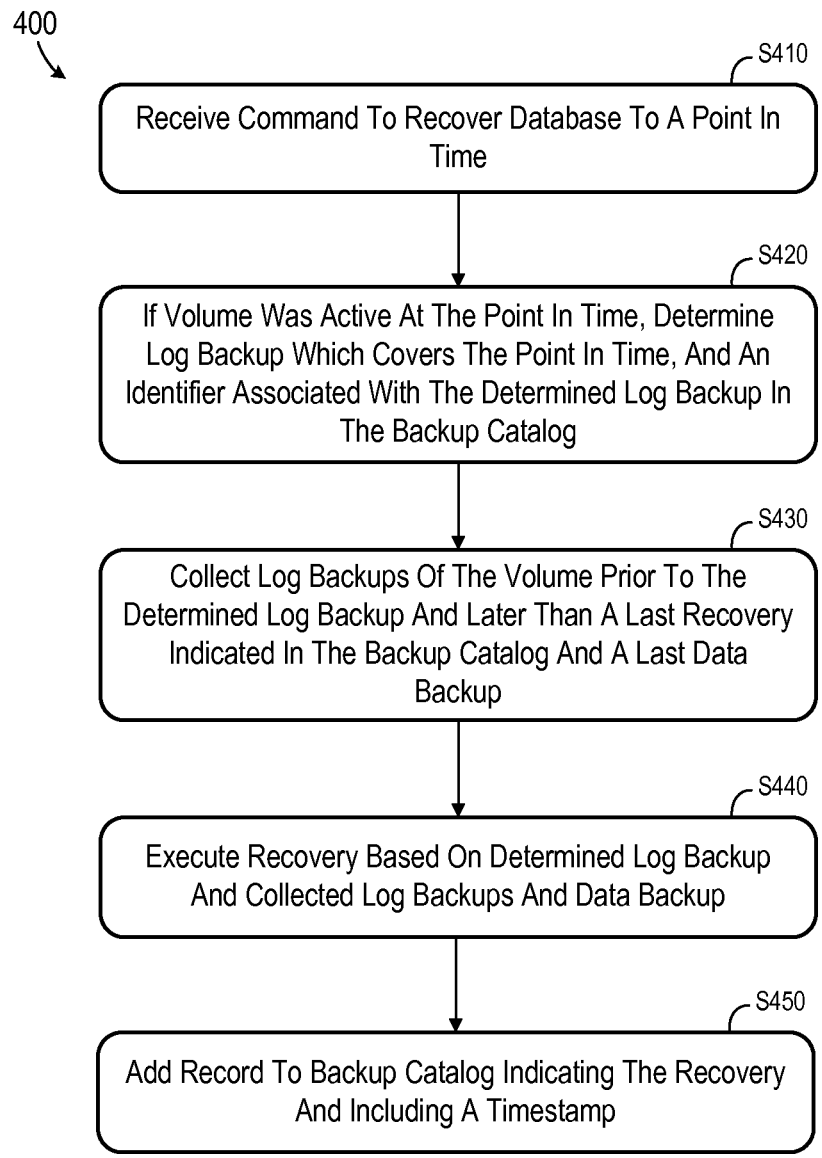
FIG. 4 is a flow diagram of a process according to some embodiments.

FIG. 4 is a flow diagram of process 400 to recover a database according to some embodiments. As described with respect to process 300, process 400 may be executed with respect to a specific data volume.

Initially, at S410, a command is received to recover a database to a point in time. The point in time may be an actual time or represented as a log position and volume number. The command may be provided by a database administrator, via a graphical user interface or command-line interface.

If the particular volume of interest was active at the point in time, a log backup which covers the point in time is determined at S420. Also determined at S420 is an identifier associated with the determined log backup in the backup catalog. The log backup may be determined by locating records of the backup catalog which concern the volume of interest, and by comparing the recovery point in time with the timestamps or log positions associated with those records. The identifier (e.g., the GUID) is then determined from the backup catalog record of the determined log backup.

According to some embodiments, the backup catalog includes records indicating when a volume is removed or added, and when a recovery occurs. Backup catalog 200 of FIG. 5 shows record 214 indicating that the IndxServr volume was removed, and includes a timestamp indicating a time at which the removal occurred.

FIG. 6 shows catalog 200 at a later time, at which record 224 has been added to show that the IndxServr volume has been added. Accordingly, if process 400 is executed with respect to the IndxServr volume and the point in time is between records 214 and 224, process 400 terminates without performing a recovery of the IndxServr volume, because the volume was not active at the recovery point in time.

Next, at S430, all other log backups of the volume prior to the determined log backup and later than a last recovery indicated in the backup catalog are collected, along with a last data backup of the volume. In this regard, and as illustrated by record 226 of catalog 200 of FIG. 7, backup catalog 200 stores a record indicating the occurrence of a recovery, along with a timestamp of the recovery.

For example, if the log backup determined at S420 is the backup associated with record 230 of backup catalog 200, then no other log records associated with the NameServr volume are collected, because none later than the last recovery exist. The last data backup, represented by record 216, is collected.

At S440, a recovery is executed based on the log backup determined at S420 and on the backups collected at S430. First, the data of the data backup is restored, and then each log backup is replayed, in order of age, up to the specified point in time. Next, at S450, a record is appended to the backup catalog indicating the recovery and including a timestamp, as shown with respect to record 226.

Figure 8:
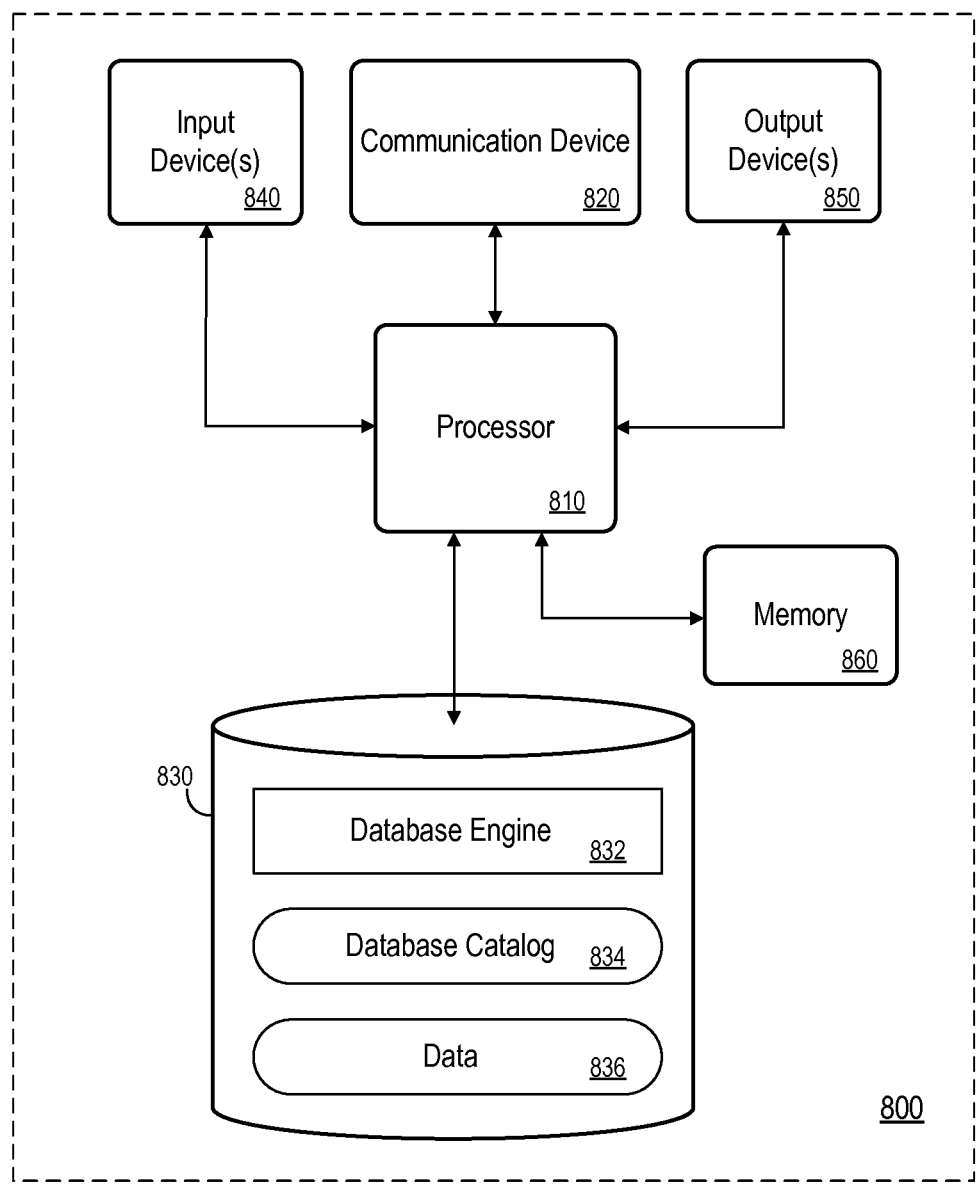
FIG. 8 is a block diagram of an apparatus according to some embodiments.

FIG. 8 is a block diagram of system 800 according to some embodiments. System 800 may comprise a general-purpose computing system and may execute program code to perform any of the processes described herein. System 800 may comprise an implementation of database system 110 according to some embodiments. System 800 may include other unshown elements according to some embodiments.

System 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Database engine 832 may comprise program code executed by processor 810 to cause apparatus 800 to perform any one or more of the processes described herein. Embodiments are not limited to execution of these processes by a single apparatus. Backup catalog 832 may comprise an implementation of backup catalog 115 and/or backup catalog 200, and data 834 may include data 114 as described above. As also described above, data 114 may be implemented using volatile memory such as memory 860. Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
a memory storing processor-executable program code; and
a processor to execute the processor-executable program code in order to cause the computing system to:
receive at a database engine of a database a command to recover the database to a point in time;
if the database was at least one of inactive after the point in time and deleted after the point in time,
then the processor is configured to execute processor-executable program code in order to cause the computing system to terminate the command,
else the processor is configured to execute processor-executable program code in order to cause the computing system to:
determine a log backup which covers the point in time;
determine a sequence identifier associated with the determined log backup;
collect one or more log backups which are older than the determined log backup and associated with the sequence identifier, and one or more data backup associated with the sequence identifier;
the collected one or more log backups and the collected one or more data backup each associated with a respective currently existing volume of the database; and
execute a recovery of each respective currently existing volume of the database based on the determined log backup, the collected log backups, and the collected data backup associated with the currently existing volume of the database.

2. A computing system according to claim 1, wherein the processor is further to execute the processor-executable program code in order to cause the computing system to:
change the sequence identifier associated with the determined log backup and the collected log backups and data backup to a new sequence identifier.

3. A computing system according to claim 2, wherein the processor is further to execute the processor-executable program code in order to cause the computing system to:
create a next log backup of the database; and
create a backup catalog record associated with the next log backup and with the new sequence identifier.

4. A computing system according to claim 2, wherein the processor is further to execute the processor-executable program code in order to cause the computing system to:
create a next data backup of the database; and
create a backup catalog record associated with the next data backup and a second new sequence identifier.

5. A computing system according to claim 4, wherein the processor is further to execute the processor-executable program code in order to cause the computing system to:
create a next log backup of the database; and
create a backup catalog record associated with the next log backup and with the second new sequence identifier.

6. A non-transitory computer-readable medium storing program code, the program code executable by a processor of a computing system to cause the computing system to:
- receive at a database engine of a database a command to recover the database to a point in time;
- if the database was at least one of inactive after the point in time and deleted after the point in time,
  - then the program code instructs the processor to cause the computing system to terminate the command,
  - else the program code instructs the processor to cause the computing system to:
- determine a log backup which covers the point in time;
- determine a sequence identifier associated with the determined log backup;
- collect one or more log backups which are older than the determined log backup and associated with the sequence identifier, and one or more data backup associated with the sequence identifier;
- the collected one or more log backups and the collected one or more data backup each associated with a respective currently existing volume of the database; and
- execute a recovery of each respective currently existing volume of the database based on the determined log backup, the collected log backups, and the collected data backup associated with the currently existing volume of the database.

7. A non-transitory computer-readable medium according to claim 6, wherein the program code executable by a processor of a computing system to cause the computing system to:
- change the sequence identifier associated with the determined log backup and the collected log backups and data backup to a new sequence identifier.

8. A non-transitory computer-readable medium according to claim 7, wherein the program code executable by a processor of a computing system to cause the computing system to:
- create a next log backup of the database; and
- create a backup catalog record associated with the next log backup and with the new sequence identifier.

9. A non-transitory computer-readable medium according to claim 7, the program code executable by a processor of a computing system to cause the computing system to:
- create a next data backup of the database; and
- create a backup catalog record associated with the next data backup and a second new sequence identifier.

10. A non-transitory computer-readable medium according to claim 9, the program code executable by a processor of a computing system to cause the computing system to:
- create a next log backup of the database; and
- create a backup catalog record associated with the next log backup and with the second new sequence identifier.

11. A computer-implemented method comprising:
- receiving at a database engine of a database a command to recover the database to a point in time;
- if the database was at least one of inactive after the point in time and deleted after the point in time,
  - then the processor is configured to execute processor-executable program code in order to cause the computing system to terminate the command,
  - else the processor is configured to execute processor-executable program code in order to cause the computing system to:
- determining a log backup which covers the point in time;
- determining a sequence identifier associated with the determined log backup;
- collecting one or more log backups which are older than the determined log backup and associated with the sequence identifier, and one or more data backup associated with the sequence identifier;
- the collected one or more log backups and the collected one or more data backup each associated with a respective currently existing volume of the database; and
- executing a recovery of each respective currently existing volume of the database based on the determined log backup, the collected log backups, and the collected data backup associated with the currently existing volume of the database.

12. A computer-implemented method according to claim 11, further comprising:
- changing the sequence identifier associated with the determined log backup and the collected log backups and data backup to a new sequence identifier.

13. A computer-implemented method according to claim 12, further comprising:
- creating a next log backup of the database; and
- creating a backup catalog record associated with the next log backup and with the new sequence identifier.

14. A computer-implemented method according to claim 12, further comprising:
- creating a next data backup of the database; and
- creating a backup catalog record associated with the next data backup and a second new sequence identifier.

15. A computer-implemented method according to claim 14, further comprising:
- creating a next log backup of the database; and
- creating a backup catalog record associated with the next log backup and with the second new sequence identifier.

* * * * *